United States Patent Office 3,234,486
Patented Feb. 8, 1966

3,234,486
PHASE MODULATOR
Reginald Gordon Wicker, Coundon, Coventry, England, assignor to Hazeltine Research, Inc., Chicago, Ill., a corporation of Illinois
Filed Feb. 1, 1962, Ser. No. 170,595
Claims priority, application Great Britain, Mar. 1, 1961, 7,472/61
1 Claim. (Cl. 332—16)

This invention relates to phase modulator circuits.

It is an object of the present invention to provide a simple and inexpensive phase modulation circuit.

It is a further object of the present invention to provide a phase modulator circuit wherein the maximum phase variation is in the neighborhood of 45°.

In accordance with the present invention a phase modulator circuit comprises an electronic valve having means for supplying an electric current, first and second means for collecting the current and first and second means for controlling the flow of the current, the magnitudes of the currents at both current collecting means being dependent upon the control effect of the first control means and the ratio of the magnitudes of the currents at both current collecting means being dependent upon the control effect of the second control means. The phase modulator circuit further comprises a first load impedance coupled between the current supply means and the first current collecting means, a second load impedance coupled between the current supply means and the second current collecting means, means for coupling the first current collecting means to the second load impedance, means for applying a signal to be modulated to the first current control means, means for applying a modulating signal to the second control means and means for deriving an output from across the second load impedance.

In a preferred embodiment in accordance with the invention the electronic valve includes a cathode, an anode and first, second and third grids arranged in the order stated between the cathode and anode, the first grid constituting the first control means, the second grid constituting the first collecting means, the third grid constituting the second control means and the anode constituting the second collecting means.

For a better understanding of the present invention, together with other and further objects thereof, reference is had to the following description taken in connection with the accompanying drawing, and its scope will be pointed out in the appended claim.

Referring to the drawing.

Figure 1:
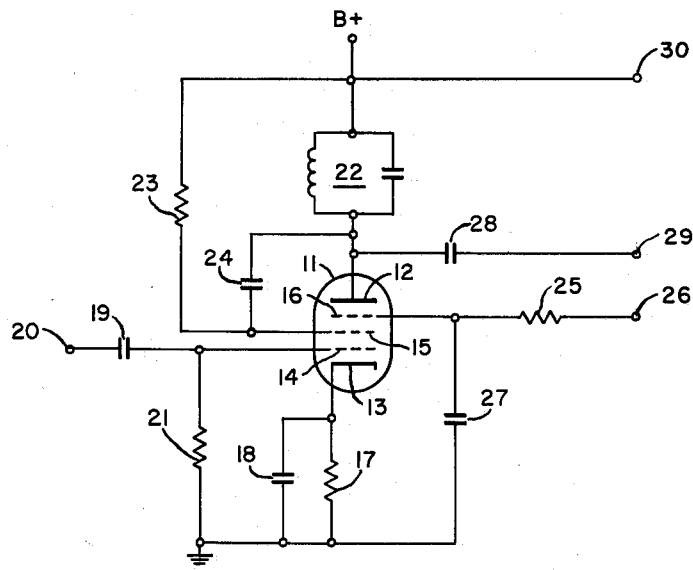
FIGURE 1 is a circuit diagram of a phase modulator circuit.

Referring to FIGURE 1 of the drawing, the circuit includes a pentode valve 11 having an anode 12, a cathode 13 and three grids 14, 15 and 16 arranged in the order stated between the cathode 13 and the anode 12. The cathode 13 is connected to ground via a resistor 17 which is shunted by a capacitor 18 and the first grid 14 is connected via a capacitor 19 to a terminal 20 to which, in operation, a radio frequency signal to be modulated is applied; the grid 14 is also connected to ground via a resistor 21. The anode 12 is connected via a parallel tuned circuit 22 to the positive terminal of D.C. voltage source (B+) whose negative terminal is grounded, the tuned circuit 22 being resonant at the frequency of the signal to be modulated; the second grid 15 is connected to the positive terminal of the D.C. voltage source via a resistor 23 and to the anode 12 via a capacitor 24; the third grid 16 is connected via a resistor 25 to a terminal 26, to which an audio frequency modulating signal is applied in operation, and is grounded with respect to radio frequency currents via a capacitor 27. An output is derived across tuned circuit 22 by terminal 30 and terminal 29 via capacitor 28.

In operation of the circuit, the components 17 and 18 bias the cathode 13 and the components 19 and 21 bias the grid 14 so that the valve 11 operates in Class C. Pulses of cathode current, therefore, result from the application of the signal to be modulated to the grid 14. The magnitude of the voltage of the B+ supply is such that the magnitude of the cathode current is substantially independent of the potentials of the anode 12 and the grids 15 and 16 and such that the cathode current, to a first approximation, divides between the anode 12 and the grid 15 in a ratio dependent on the potential of the grid 16. The impedances in the circuits of the second grid 15 and the anode 12 and the bias potential of the third grid 16 with respect to the cathode 13 are such that, in the absence of the modulating signal at the grid 16 and with the capacitor 24 disconnected, the radio frequency voltages appearing at the grid 15 and the anode 12 are substantially equal and such that the amplitude of the radio frequency current at the grid 15 is large compared with the amplitude of the corresponding anode current.

Figure 2:
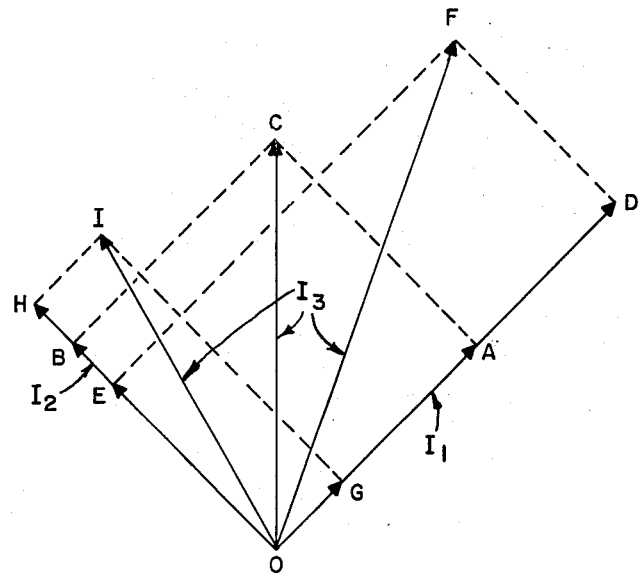
FIGURE 2 is a vector diagram illustrating the operation of the circuit shown in FIGURE 1.

Referring now to FIGURE 2 of the drawing, a portion $I_1$ (represented by the line OA in FIGURE 2) of the radio frequency anode current flows through the tuned circuit 22 in operation. In addition, with the capacitor 24 connected between the anode 12 and the grid 15, a portion $I_2$ (represented by the line OB in FIGURE 2) of the radio frequency current at the grid 15 flows through the tuned circuit 22, this current $I_2$ being substantially 90° out of phase with the current $I_1$ due to the reactance of the capacitor 24. The value of the capacitor 24 is chosen so that, with no modulating signal applied to the grid 16 the total current $I_3$ flowing through the tuned circuit 22 (represented by the line OC in FIGURE 2) is approximately 45° out of phase with the current $I_1$.

When the modulating signal is applied to the grid 16 the current at the grid 15 rises and the anode current falls, or vice versa, depending on the instantaneous polarity of the modulating signal, keeping the sum of these two currents substantially constant. Thus, the ratio of the amplitudes of the currents $I_1$ and $I_2$ and hence the phases of the current $I_3$ and the voltage appearing at the terminal 29 vary in accordance with the amplitude of the modulating signal. In FIGURE 2 lines OD, OE and OF respectively represent the currents $I_1$, $I_2$ and $I_3$ when the modulating signal has an instantaneous value of one polarity and the lines OG, OH and OI respectively represent the currents $I_1$, $I_2$ and $I_3$ when the modulating signal has an instantaneous value of the opposite polarity.

Since the amplitude of the radio frequency current at the grid 15 is large compared with the amplitude of the radio frequency anode current the modulating signal produces quite small proportional changes in the current at the grid 15, and hence the current $I_2$, compared with the corresponding changes in the anode current, and hence the current $I_1$. Consequently, in operation the amplitude of the current $I_2$ remains nearly constant while the amplitude of the current $I_1$ varies considerably with the modulating signal; the maximum possible change in the phase of the output voltage is therefore just under ±45° with respect to the phase of the voltage at the terminal 29 in the absence of any modulating signal.

It will be appreciated that the output voltage is amplitude modulated as well as phase modulated in accordance with the modulating signal; the amplitude modulation may of course be removed in a suitable amplitude limiting circuit if so desired.

In one arrangement of the circuit described above, by way of example, details of some of the components of the circuit are as follows:

| | | |
|---|---|---|
| Pentode 11 | | Type CV 3928 |
| Resistor 17 | ohms | 220 |
| Resistor 21 | kilohms | 100 |
| Resistor 23 | do | 3.3 |
| Resistor 25 | do | 1 |
| Capacitors 18 and 27 | picofarads | 1000 |
| Capacitors 19 and 28 | do | 47 |
| Capacitor 24 | do | 1.5 |
| D.C. source | volts | 90 |

Frequency of signal to be modulated 2 megacycles per second.

A circuit in accordance with the invention may show the following advantages compared with some known phase modulating circuits:

(a) The modulating signal and the signal to be modulated are applied to separate inputs.

(b) The impedance presented to the source of the signal to be modulated is high.

(c) The amplitude of the signal to be modulated is not critical.

In common with known phase modulating circuits, a phase modulating circuit in accordance with the invention may be utilized in a frequency modulating arrangement by integrating the modulating signal before applying it to the relevant electrode of the electronic valve.

What is claimed is:

A phase modulator circuit comprising:

a pentode having a cathode, control grid, screen grid, suppressor grid and anode;

means for coupling a signal to be modulated to said control grid;

a parallel resonant circuit coupling the anode to a source of positive potential;

a first resistive circuit coupling the screen grid to a source of positive potential, the magnitude of the current at said screen grid due to the signal to be modulated being substantially greater than the magnitude of the current at the anode due to the signal to be modulated when no signal is applied to the suppressor grid;

a capacitor coupling said screen grid to said anode, the current from said screen grid flowing through said parallel resonant circuit being approximately equal in magnitude and 90° out of phase with the current from said anode flowing through said parallel resonant circuit when no signal is supplied to said suppressor grid;

means for applying the modulating signal to the suppressor grid;

and means for deriving a modulated output signal across said parallel resonant circuit.

References Cited by the Examiner
UNITED STATES PATENTS

| | | | |
|---|---|---|---|
| 2,399,268 | 4/1946 | Usselman | 332—27 X |
| 2,676,303 | 4/1954 | Corderman | 332—28 |
| 2,866,162 | 12/1958 | Rosen et al. | 332—16 X |

ROY LAKE, *Primary Examiner.*